L. A. BUTTERFIELD.
SNAPPING ROLLS FOR CORN HUSKING MACHINES.
APPLICATION FILED JULY 19, 1919.
1,339,737.
Patented May 11, 1920.
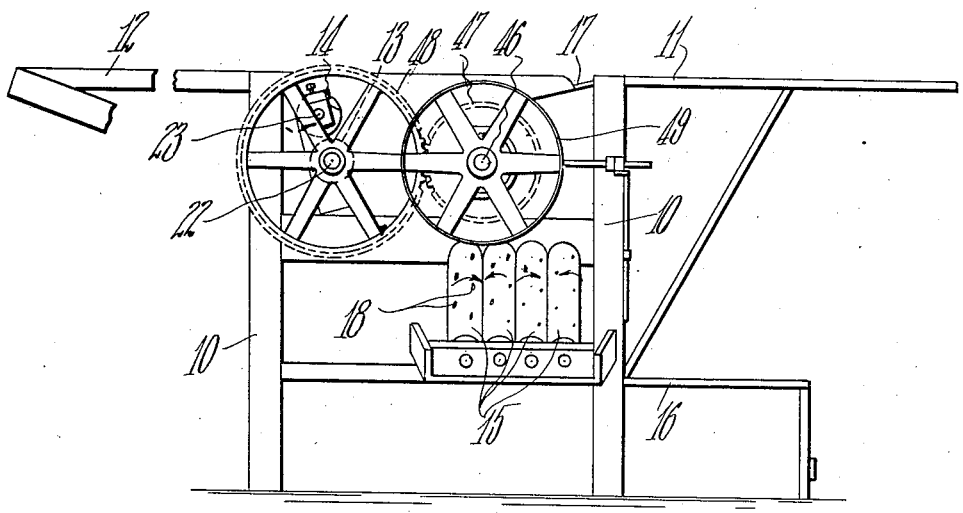
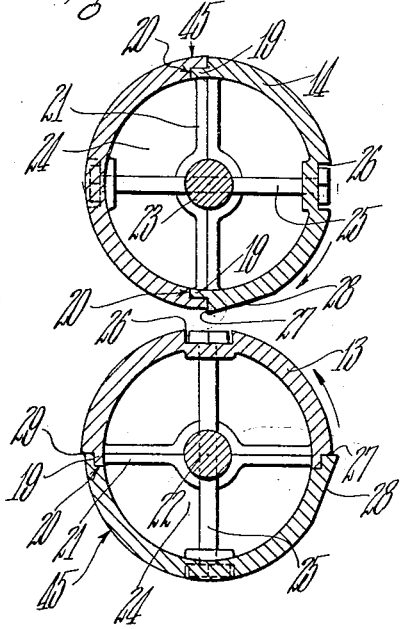
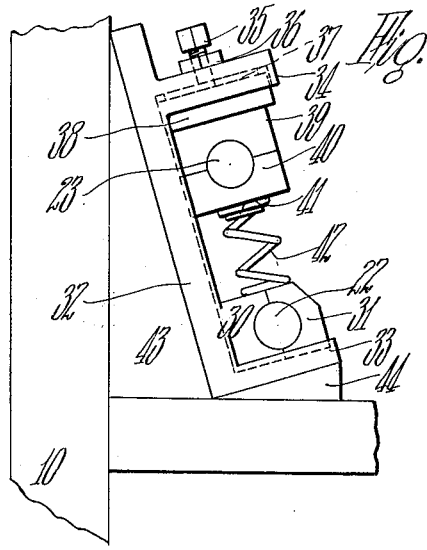
INVENTOR
Lewis A. Butterfield
BY
Chapin & Neal
ATTORNEYS.

UNITED STATES PATENT OFFICE.

LEWIS A. BUTTERFIELD, OF CHICOPEE FALLS, MASSACHUSETTS, ASSIGNOR TO THE BELCHER & TAYLOR AGRICULTURAL TOOL COMPANY, OF CHICOPEE FALLS, MASSACHUSETTS, A CORPORATION OF MASSACHUSETTS.

SNAPPING-ROLLS FOR CORN-HUSKING MACHINES.

1,339,737.  Specification of Letters Patent.  Patented May 11, 1920.

Application filed July 19, 1919. Serial No. 312,047.

*To all whom it may concern:*

Be it known that I, LEWIS A. BUTTERFIELD, a citizen of the United States of America, residing at Chicopee Falls, in the county of Hampden and State of Massachusetts, have invented certain new and useful Improvements in Snapping-Rolls for Corn-Husking Machines, of which the following is a specification.

My invention relates to improvements in snapping rolls for corn-husking machines, and to the construction and mounting of such rolls.

It has for its object the provision of rolls of such design and mounting that the ears of corn will be cleanly snapped or broken from the stalks without danger of crushing either the ears or the stalks. It has for a further object the prevention of any adherence of the corn husks to the snapping rolls and consequent drawing of the ears of corn between the rolls where they would be crushed. It has for a further object the quick removal of the ears of corn from the snapping rolls. It also has other objects which will appear in the following description and claims.

To these ends my improved snapping rolls are constructed substantially as shown in the accompanying drawings in which—

Figure 1 is an end elevation of a corn husking machine embodying my improvements;

Fig. 2 is a detail showing the mounting of the rolls; and

Fig. 3 is a sectional view of the rolls.

The husking machine consists generally of a frame 10 supporting a feed table 11 and a bracket 12 upon which may be carried one end of a conveyer (not shown) for carrying away the stalks after the ears have been stripped from them. Also carried in the frame are two snapping rolls 13 and 14, which will be more fully described later, and a plurality of husking rolls 15 of the usual type. A platform 16 is provided on which the operator may conveniently stand.

Before describing the details of the snapping rolls and their mounting, a brief general description of the operation of the husking machine will be given. The stalks, with the ears attached, are fed butt first from table 11 down a guideway 17 between the rolls 13 and 14. The stalks pass between these rolls and are either carried away by a conveyer or are cut into short lengths by any suitable cutting device. The ears are broken or snapped from the stalks by the rolls, and fall upon the husking rolls 15. These rolls extend transversely of the machine, and their axes slope toward one side, so that the ears travel progressively along the rolls and are finally discharged at the lower end. The rolls revolve in the direction of the arrows, and are provided with small pins 18 which catch the husks, stripping them from the ears, while not injuring the ears themselves. Machines of this type, having the same general system of operation, are old, and I will now proceed with the description of the improved snapping rolls.

The rolls 13 and 14 are preferably constructed of cast iron, as I have found that the husks do not adhere to this material. Sticking of the husks to the snapping rolls is detrimental, as it frequently draws the ears between the rolls and crushes them and is certain to cause more or less jamming and blocking of the passage between the rolls. Each roll is made of two semi-cylindrical pieces, one of which has longitudinal flanges 19 near its edges, and the other of which has longitudinal notches 20 which receive the flanges. The sections are fitted with end flanges 21 which closely embrace supporting shafts 22 and 23, and intermediate flanges 24, which serve as strengthening members. In order to hold the sections together and in position upon their shafts, I provide bolts 25 which pass through the supporting shafts and have their heads and nuts countersunk within the surface of the rolls.

The shape of the periphery of the rolls is of importance in assuring that the ears of corn will be properly snapped from their stalks. Each roll has a notch 26 running the full length of the roll and serving both as a counterbore for the head of bolt 25 and as an active element in the snapping operation. As the rolls are mounted in the machine these notches lie at an angle of 90° to each other. Coöperating with each notch is a shoulder 27 on the opposing roll, which is tapered off to form a cam surface 28 on the side of the roll which is to the rear as it rotates in the direction of the arrow. It is sometimes desirable to form the shoulders by casting the roll sections somewhat eccentrically, and in this case there will be a slight shoulder 29 opposite shoulder 27. This is purely incidental, and accomplishes little or nothing in the removal of the ears from the stalks.

The shaft 22 is carried in a split bushing 30, 31, which is supported by a guide 32 having a retaining flange 33 for keeping the bushing in position. The guide has a cap 34 in which is mounted a set screw 35, having a lock nut 36 and bearing against a plate 37. Separated from this plate by a rubber block 38 is a split bearing 39, 40, in which runs the shaft 23. The lower member of this bearing has a boss 41 which supports the spring 42, compressed between the two bushings. The guide 32 is held in position on the frame in any suitable manner, as by blocks 43 and 44, which maintain it and the shafts 22 and 23 in a slightly inclined position. This manner of mounting the rolls permits one roll to have an elastic movement either up or down, and effectually prevents the upper roll dropping low enough to crush the stalks as they pass by.

A description will now be given of the functioning of the improved rolls. As previously stated, the snapping rolls revolve in the directions indicated by the arrows in Fig. 3. The stalks, with the ears of corn attached, are fed butt first, and preferably at an angle, to the right hand side of the rolls as viewed in this figure. Feeding of the stalks will be accomplished by frictional engagement with the rolls, and by the engagement of shoulders 27 with the stalk. When the stalk has been fed inwardly until an ear of corn is adjacent the opening between the rolls the friction between the rolls and the stalk will be insufficient to draw the stalk through. When a shoulder 27 comes in contact with the stalk, however, the stalk will be gripped between the shoulder and the edges of the opposing groove 26, and the butt of the ear will contact with the cam surface 28. The shoulder and groove slightly bend the stalk adjacent the ear, and this, combined with the feeding action of the stalk, the impossibility of drawing the ear between the rolls, and the effect of the cam surface 28, effectually severs the ear from the stalk, and snaps or flips it clear of the rolls.

It will be noted that there are but two co-operating sets of shoulders and grooves, and these occur at 90° from each other instead of being diametrically opposite. Any desired number of sets may be used, and may be arranged symmetrically, but the unsymmetrical construction shown is deemed preferable for the following reason. It has been found that the ears of corn are arranged on the stalk in clusters, usually two ears being substantially opposite each other. By arranging the snapping elements on the roll in comparatively closely spaced relation with a feeding space 45 between them, it will be found that the ears of a cluster will be removed in rapid succession and the stalk will be rapidly fed forward until the next cluster is reached, whereas if the snapping elements are arranged symmetrically, a considerable portion of the feeding action of the rolls will frequently be lost on account of the presence of an ear blocking the forward motion of a cluster. It will be, of course, understood that where two or more ears are located close enough together they may be snapped from the stalk by the action of one pair of snapping elements. This will usually be the case with clusters of more than two ears.

In order to drive the snapping rolls they may be geared together in any suitable manner, and shaft 22 may receive motion from a drive shaft 46 by gears 47, 48. A pulley 49 on the drive shaft may be supplied, by which the shaft receives motion from any suitable source of power.

I claim—

1. A snapping roll consisting of two semi-cylindrical sections with abutting ends, one of said sections having a radial projection forming a shoulder on one of its ends and one of said sections having a groove midway between its ends, said projection and groove each extending the entire working length of its section.

2. A snapping roll for a corn husking machine comprising a pair of sections fitted with interlocking members and mounted eccentrically with regard to each other so as to provide a longitudinal shoulder at the line of contact of the sections.

3. A snapping roll for a corn husking machine comprising a central shaft, and a pair of cast iron semi-cylindrical sections secured to the shaft eccentrically, whereby a longitudinal shoulder is provided at the line of contact of the sections.

4. A snapping roll for a corn husking machine comprising a pair of semi-cylindrical sections joined together eccentrically so as to provide a shoulder at the line of contact of the sections, and a longitudinal groove in the outer surface of one of the sections.

5. A pair of snapping rolls for a corn husking machine having two sets of co-operating snapping elements, the elements in each set being disposed substantially ninety degrees apart and followed by a smooth portion of the rolls' periphery substantially of two hundred and seventy degrees extent, each element comprising a relatively wide longitudinal groove in the periphery of one roll and a longitudinal shoulder-forming projection beyond the periphery of the other roll, which projection is backed up and connected to such periphery by a relatively wide, flattened and substantially tangential portion.

LEWIS A. BUTTERFIELD.